Dec. 28, 1948.  J. R. SEBASTIAN  2,457,408
CONVEYER SWITCH
Filed March 20, 1946  2 Sheets-Sheet 1
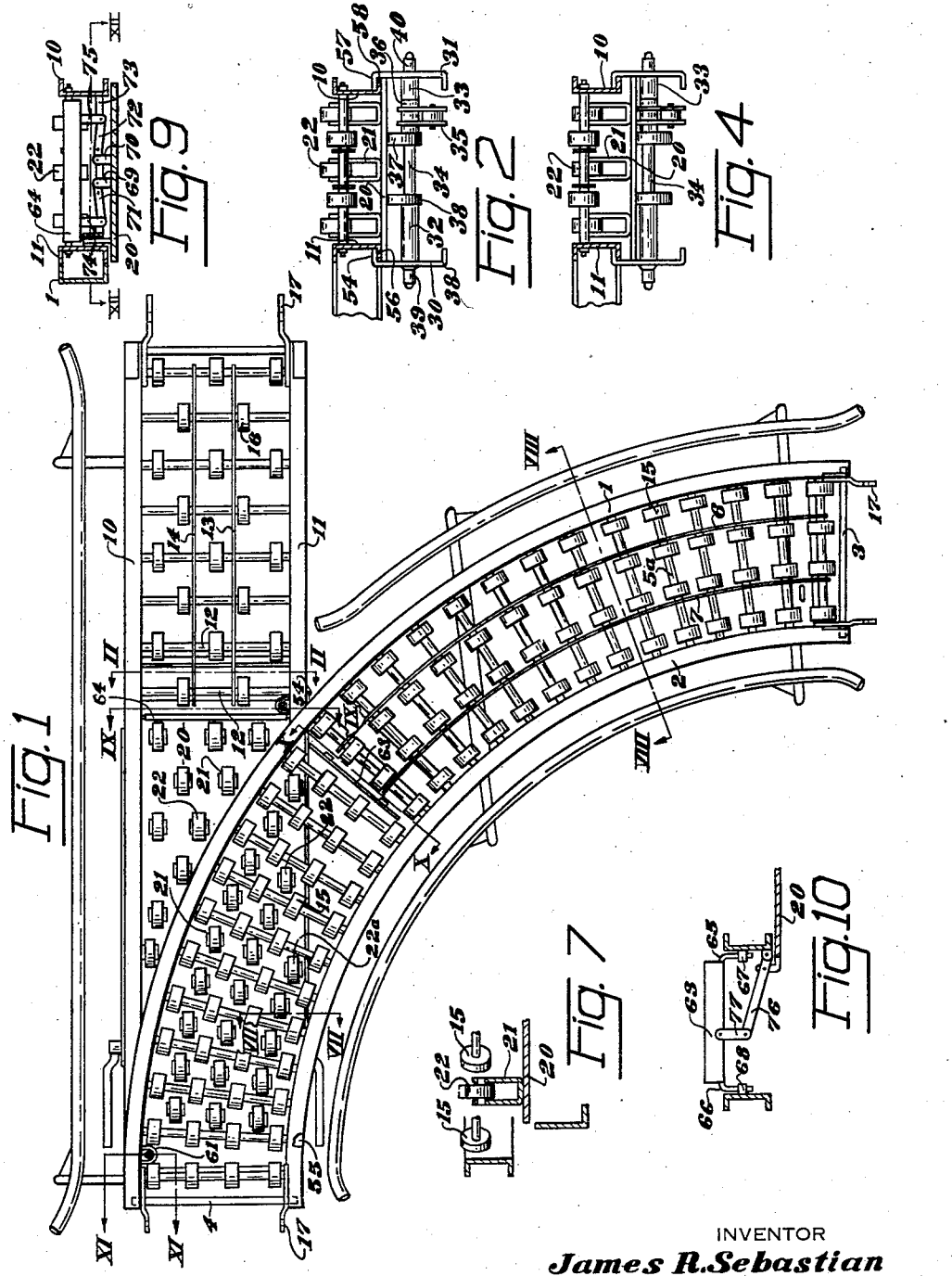
INVENTOR
*James R. Sebastian*
BY
ATTORNEY Dec. 28, 1948.   J. R. SEBASTIAN   2,457,408
CONVEYER SWITCH
Filed March 20, 1946   2 Sheets-Sheet 2
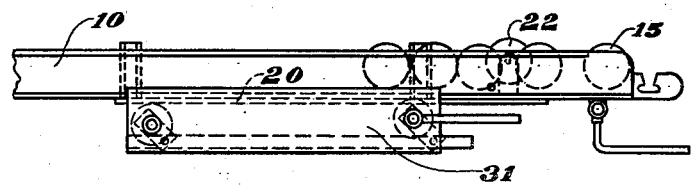
Fig. 3
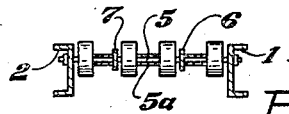
Fig. 8
Fig. 11
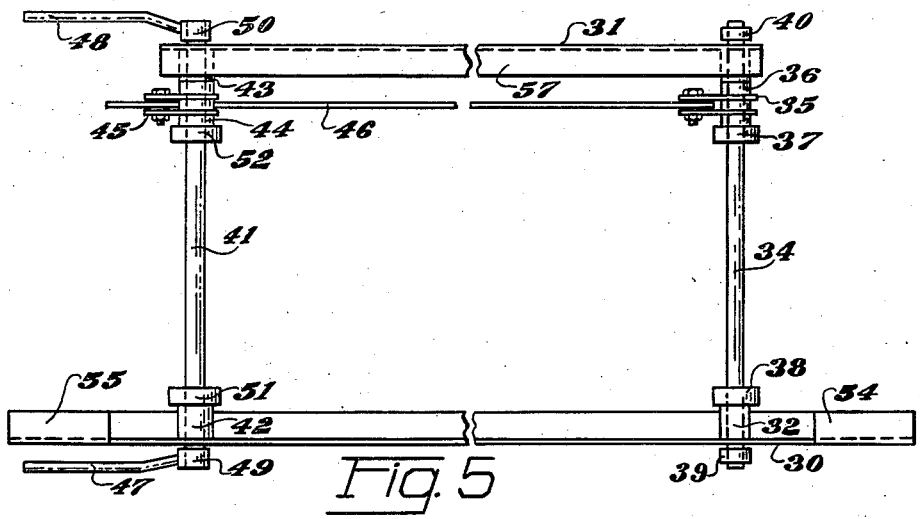
Fig. 5
Fig. 6
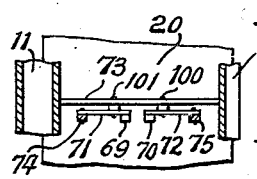
Fig. 12
INVENTOR
James R. Sebastian
BY
ATTORNEY Patented Dec. 28, 1948

2,457,408

UNITED STATES PATENT OFFICE 2,457,408

CONVEYER SWITCH

James R. Sebastian, Grand Rapids, Mich., assignor to The Rapids-Standard Company, Inc., Grand Rapids, Mich., a corporation of Michigan Application March 20, 1946, Serial No. 655,723

7 Claims. (Cl. 193—36)

This invention relates to a switch for a gravity type conveyor and particularly contemplates providing a switching mechanism which will operate readily and which is not likely to get out of order.

While a wide variety of switching mechanisms applicable to gravity conveyors are known to the prior art, they all are of relatively great complexity, sometimes requiring in their operation the movement of an entire section of the conveyor track or are subject to others of a variety of disadvantages. Accordingly, it is desirable to provide such a switching mechanism which will eliminate the necessity for pivotally moving a major section of the conveyor track and yet will provide a series of conveyor rollers having their planes of rotation aligned in the direction toward which a given setting of the switch is intended to move articles being handled by the conveyor.

Therefore, a major object of my invention has been to provide a conveyor switch providing alignment of the rollers in the direction of movement of articles being moved on said conveyor yet without requiring any pivotal movement of a major part of the conveyor track.

A further object of my invention has been to provide a switch as aforesaid in which the only movement required to be made is of relatively small extent.

A further object of my invention has been to provide a switch as aforesaid having incorporated therewith an automatically operating mechanism preventing entry into the switch area from the respective branches of articles being handled by the conveyor which mechanism will operate automatically with the operation of the switch.

A further object of my invention is to provide a conveyor switch as aforesaid which can be readily fabricated and which requires a minimum of complex parts.

A further object of my invention has been to provide a conveyor switch as aforesaid having a small number of moving parts by which the likelihood of such parts getting out of order is minimized.

Other objects and purposes of my invention will be apparent to persons acquainted with equipment of this type upon examination of the accompanying drawings and reading of the following disclosure.

In the drawings:

Figure 1 represents a top view of a switch embodying my invention.

Figure 2 represents a partially sectional view taken on the lines II—II of Figure 1.

Figure 3 represents a fragmentary side view of my switch taken from the side away from which the turn is made, this being the left side of Figure 1 looking in the direction of the straight portion of the switch.

Figure 4 is a view similar to Figure 2 showing another position of the movable elements.

Figure 5 is a broken plan view of the switch operating mechanism separated from the rest of the construction.

Figure 6 is a broken side view of the mechanism shown in Figure 5.

Figure 7 is a somewhat schematic partially sectioned view wherein the sectioned portion is taken on the line VII—VII of Figure 1.

Figure 8 is a section on the line VIII—VIII of Figure 1.

Figure 9 is a somewhat schematic section taken on the line IX—IX of Figure 1.

Figure 10 is a similarly schematic section taken on the line X—X of Figure 1.

Figure 11 is a fragmentary section taken on the line XI—XI of Figure 1.

Figure 12 is a section taken on the line XII—XII of Figure 9.

In general, I have provided a switch answering the objects and purposes above set forth by mounting one series of rollers in a relatively fixed position and another series of rollers for vertical movement relative thereto, wherein the said second series of rollers are inter-positioned among the first series of rollers but in a manner to clear same for the said vertical movement. In the embodiment here selected for illustrative purposes, and illustrated in the drawings, the permanently mounted rollers are associated with the curved portion of the switch and the movably mounted rollers are associated with the straight portion of the switch. When the movable rollers are in their lowered position a box, or other article being carried by the conveyor, approaching the switch will contact only the rollers associated with the curved portion and will hence follow them without regard to the straight part of the switch. When by simple mechanical movement the rollers associated with the straight part of the switch are lifted into their uppermost position they extend a distance above the rollers associated with the curved part of the switch sufficiently to carry the said box, or other article, on themselves and without regard to the rollers associated with the curved part of the switch. In this way the switch may be caused to function by only a simple and limited movement of one set of rollers a short distance in a vertical direction.

A vertically movable gate may be provided at the point of entry from each of the respective branches into the switch area and the means actuating said vertically moving rollers may be readily utilized automatically to move said gates in and out of track blocking position.

In the drawings there appears a representation of one specific embodiment of my invention selected for illustrative purposes which, however, should be understood as illustrative only and in no way limiting. The switch mechanism shown contemplates a switch having one straight portion and one portion curved to the right through a ninety degree arc. It will be evident that a similar curve to the left may be made, curves in either direction through other degrees of arc and constructions wherein the both parts of the switch are curved may alternate as modifications of this specific embodiment.

The curved portion of the switch comprises a pair of opposed side channels 1 and 2 (Figures 1 and 3) connected at each of their respective ends by end pieces 3 and 4. These side channels 1 and 2 are likewise joined and held rigidly with respect to each other by a plurality of roller supporting rods 5. The construction is further strengthened by one or more, here two, reinforcing strips 6 and 7 arranged parallel with the side channels and through which pass the roller supporting rods 5. These rods and reinforcing strips are fixed immovably with respect to each other and to the side channels in any convenient manner, as by threading the ends of the rods for receiving nuts thereon and providing tubular spacer members 5a encircling the rods between said reinforcing strips and between the hereinafter mentioned rollers.

The straight portion of the track is provided by another pair of similar frame members 10 and 11 which are fixed to the curved frame member 1, as by welding, to define the shape of switch desired. A plurality of cross rods 12 and reinforcing strips 13 and 14 are affixed between these frame members in the portion thereof beyond the juncture of the conveyor frames, and are fastened in position in any convenient manner which will usually be, but is not necessarily similar to the fastening of the rods 5 and reinforcing strips 6 and 7 shown in the curved portion of the switch.

Mounted on the cross rods 5 and the cross rods 12 are a plurality of rollers 15 and 16 which are of any convenient type conventionally used in gravity type conveyors, but preferably they are of the ball bearing type, and are mounted in any convenient and conventional manner. The ends of the conveyor sections comprising this switch are provided with hook elements 17 or other convenient means for holding this switch in operative position with respect to associated conveyor sections.

As thus far described, the conveyor section is of conventional construction and forms no part of my invention excepting only as it is a part of the overall construction comprising my improved switch.

Referring now in more detail to the switch portion itself, there is held, by means hereinafter to be described, a platform 20 substantially at or slightly below the lowermost edge of the side channels 1, 2, 10 and 11. Affixed to this platform is a plurality of roller supporting U-shaped brackets 21 rotatably supporting a plurality of rollers 22 of any conventional type but preferably including ball bearing construction. These rollers are all positioned with their axes of rotation parallel to the axes of rotation of the rollers 16 with which they cooperate. The several roller supporting brackets are positioned on the platform 20 in such a pattern that the respective rollers are positioned between the various units of the rollers 15 associated with the curved part of the switch as best shown in Figure 1. Mounted directly below the platform 20 is the mechanism supporting and moving said platform. It comprises a pair of side frame members 30 and 31 which are preferably of channel construction but may be of any other construction which lends itself conveniently for the purpose. Suitably welded to the facing sides of said guide channels 30 and 31 are bearing members 32 and 33. Extending to and supported by these bearing members and through corresponding openings in the said side channels 31 and 32 is a rotatable rod 34. A crank member 35 is affixed to the collar 36 and said collar is held in any convenient manner, as by a set screw, in adjustably fixed relationship with said rotatable rod 34. The outward end of said collar 36 contacts the inward end of the bearing 33 to act as a spacer. Immediately inward of the bearing 32 and the collar 36 the eccentrics 37 and 38 are welded to the shaft 34. A pair of collars 39 and 40 are affixed in any convenient manner, as by set screws, one onto each end of the shaft 34 outwardly of the side channel 30 and 31. A similar construction is provided at the other end of the platform supporting structure and comprises a shaft 41 similarly mounted and rotatably held with respect to the side frame members by suitable bearings 42 and 43. Immediately inwardly of the bearing member 43, adjacent the side frame member 31, is a collar member 44 adjustably affixed to the said shaft 41 in any convenient manner, as by a set screw, and supporting a crank 45. The said two cranks are connected by any convenient connecting element 46 pivotally associated therewith. At the ends of said shaft 41 outwardly of the side frame members are a pair of operating cranks 47 and 48, held onto said shaft by suitable collar portions 49 and 50 which are fixed to said shaft in any convenient manner as by set screws. Said crank members are of sufficient length to be readily manually operable. Also fixed onto said shaft 41 immediately inwardly of the bearing 42 and the collar 44 are a pair of eccentrics 51 and 52 similar to the eccentrics 37 and 38 at the other end of the platform supporting construction. Thus, an operator by manually grasping either of the operating handles 47 or 48 and actuating same to cause a rotation of the shaft 41 will effect movement of all four eccentrics around their respective centers of rotation.

The side frame member 30 is centrally cut out along its upper edge as shown at 53 in order to provide clearance for the curving portion of the switch track and the extreme edge of the platform 20 such as the portion thereof supporting the roller 22a. This leaves only the end portions of the side frame member 30 uncut and provides a pair of relatively short engaging flanges 54 and 55 at each extreme end of said side frame member. The flange 54 engages the outwardly turned lower flange 56 (Figure 2) of the side frame member 11, and the flange 55 engages the corresponding part of that portion of the side frame member 2 which is substantially aligned with the side frame member 11. Said engaging portions 54 and 55 are sufficiently widely spaced apart to span the track of the turning portion of the switch.

The other frame member 31 needs to be only long enough to connect and support the eccentric supporting shafts 34 and 41. Its upper flange 57 is interengaged with and supported by the lower outwardly facing flange 58 of the side frame member 10.

The above described platform, as best shown in Figures 2 and 4, is located immediately below the outwardly turning flanges 56 and 58 of the side frame members 11 and 10, respectively, and rests upon said four eccentrics by which to have a limited upward and downward movement as the said eccentrics are rotated on their supporting shafts. Such upward and downward movement is of such magnitude with respect to the construction of the associated parts of the device that in the upward position (Figure 2) the platform supported by rollers 22 define by their uppermost elements a plane spaced vertically above the plane defined by the uppermost elements of the rollers 15 associated with the curved part of the switch. In this position, an article, such as a box, moving along the conveyor will contact only the platform mounted rollers 22 and will move in either direction along the straight part of the switch and without regard for the curved part.

When the platform is in its lowered position, as shown in Figure 4, the platform supported rollers define by their uppermost elements a plane below the corresponding plane defined by the uppermost elements of the rollers 15 associated with the curved part of the switch so that a box, or other article, moving along the conveyor will be supported solely by said rollers 15 and thus follow in either direction the curved track without regard for the straight portion of the track.

Thus the switching from one track to the other is effected by a simple upward or downward movement of the platform 20 and the rollers associated therewith. This in turn is effected by actuation of either of the handles 47 or 48 turning the shaft 41 and through the connecting member 46 and the crank associated therewith turning the shaft 34, and by the turning of said shafts rotate the eccentrics. The platform 20, being supported solely by said eccentrics, will be moved upwardly or downwardly accordingly.

The platform 20 is held against endwise movement by one or more vertical pins 60 (Figure 11) held within a sleeve 61 which sleeve is suitably fastened in any convenient manner, as by welding, to an adjacent portion of a side frame member, as the member 1.

The gate and gate operating mechanism are shown in Figures 9 and 10 somewhat schematically inasmuch as these parts may be constructed in a wide variety of specific forms of which several will be readily apparent.

Interposed between appropriate rollers and between the side frames of each track where each of said branching tracks enter into the switch portion of the mechanism there are located the gates 63 and 64. These may be mounted for vertically guided movement in any convenient manner, such as by pins 65 and 66 guided in sleeves 67 and 68 as illustrated in Figure 10. Similar guiding may be provided in Figure 9, although to avoid confusion of parts specific showing thereof has been omitted. Inasmuch as the plate 20 moves vertically, simple lever operation actuated by said plate can readily be provided for moving said gates vertically a distance sufficient to place them, when in track blocking position, well above the plane of the upper elements of said rollers. As shown in Figure 9 a pair of uprights 69 and 70 may be fixed to the plate 20 and pivoted to a pair of levers 71 and 72 respectively. These levers 71 and 72 are pivotally mounted upon a cross-member 73 (Fig. 12). At their respective other ends said levers are pivoted to the gate actuating members 74 and 75. Thus, when said platform 20 moves vertically said levers will be operated to move the vertical members 74 and 75 in a vertical plane and thus move the gate 64 likewise. By suitable positioning of the pivot point of said levers onto said supporting cross-member any desired ratio of movement of said gate with respect to movement of said platform may be obtained. In a preferred embodiment of the hereindisclosed switch said platform 20 has a vertical movement of approximately one-half inch so that it will be an easy matter to secure a vertical movement of said gate of approximately two inches. This will cause it to extend an ample distance above the plane of the uppermost elements of said rollers 16 to stop articles being carried by said conveyor which would otherwise enter the switch area.

It will be observed that when the platform 20 is in its uppermost postion the gate 64 is down.

In Figure 10 there is illustrated similar construction applicable to the gate 63 placed within the branching portion of the switch. As the platform 20 moves vertically a lever 76 is actuated thereby and acts through the connecting link 77 to move the gate 63 upwardly or downwardly as required. It will be here noted that with the platform 20 in its uppermost position the gate 64 is likewise in its uppermost position thereby blocking passage of articles from said branching part of the switch into the switch area.

Various modifications of this described construction will be immediately apparent to persons acquainted with equipment of this type and accordingly the hereinafter appended claims should be interpreted to cover such modifications and variations excepting as said claims by their own terms expressly require otherwise.

I claim:

1. In a conveyor switch mechanism having one track branching from another track, the combination comprising: a first pair of curved rails defining one track; a second pair of rails rigidly affixed to at least one of said first pair of rails and defining a second track, the whole being rigidly arranged and detachably held in operable position; a platform positioned for vertical movement between said second pair of rails and at least partially in the area common to both of said tracks; a plurality of rollers rotatably mounted on fixed axes between said first pair of rails and a further plurality of rollers rotatably mounted on fixed axes between at least a portion of said second pair of rails; a further group of rollers mounted on said platform and at least partially located in an area common to both of said tracks and in said area interpositioned among said first named rollers for simultaneous upward and downward movement with respect thereto; a pair of cams below and at each of the ends of said platform adapted for effecting vertical movement of said platform; a bar operatively connecting each of the pairs of cams and adapted for coordinating their rotation; means for rotating said cams.

2. In a conveyor switch mechanism having one track branching from another track, the combination comprising: a first pair of curved rails defining one track and having a plurality of article supporting rollers in operative position therebetween; a second pair of rails affixed branchingly and rigidly to said first pair of rails defining a second track and likewise having a plurality of article supporting rollers in operative position therebetween; means including a vertically movable platform having a plurality of article supporting rollers mounted thereon effecting switching from one track to the other; means including a pair of cams at each of the ends of said platform for effecting vertical movement of said platform; a vertically movable gate selectively blocking at least one of said tracks and thereby preventing passage of articles carried by said conveyor from said track into the area of juncture of said two tracks; means operative from said vertically moving platform actuating said gate whereby said gate is moved into and out from article blocking position as the switch is moved with respect to the track in which said gate is located out from or into respectively article conveying position.

3. In a conveyor switch mechanism having one track branching from another track, the combination comprising: a first pair of curved rails defining one track; a second pair of rails rigidly affixed to at least one of said first pair of rails and defining a second track, the whole being rigidly arranged and detachably held in operable position; a platform positioned for vertical movement between said second pair of rails and at least partially in the area common to both of said tracks; a plurality of rollers rotatably mounted between said first pair of rails adjacent to and within said area common to both of said tracks and a further plurality of rollers rotatably mounted between at least a portion of said second pair of rails and adjacent said platform; a further group of rollers mounted on said platform and at least partially located in an area common to both of said tracks and in said area interpositioned among said first named rollers for simultaneous upward and downward movement with respect thereto; a cam below and at each of the ends of said platform adapted for effecting simultaneous vertical movement of said entire platform; a bar operatively connecting each of said cams and adapted for coordinating their rotation, and means for rotating said cams.

4. In a conveyor switch mechanism having one track branching from another track, the combination comprising: a first pair of curved rails defining one track; a second pair of rails rigidly affixed to at least one of said first pair of rails and defining a second track, the whole being rigidly arranged and detachably held in operable position; a platform positioned for vertical movement between said second pair of rails and at least partially in the area common to both of said tracks; a plurality of rollers rotatably mounted between said first pair of rails adjacent to and within said area common to both of said tracks and a further plurality of rollers rotatably mounted between at least a portion of said second pair of rails and adjacent said platform; a further group of rollers mounted on said platform and at least partially located in an area common to both of said tracks and in said area interpositioned among said first named rollers for simultaneous upward and downward movement with respect thereto; means below and at each of the ends of said platform adapted for effecting simultaneous vertical movement of said entire platform; a bar operatively connecting each of said means and adapted for coordinating their operation, and means for effecting such operation.

5. In a conveyor switch mechanism having one track branching from another track, the combination comprising: a first pair of curved rails defining one track; a second pair of rails rigidly affixed to at least one of said first pair of rails and defining a second track, the whole being rigidly arranged and detachably held in operable position; a platform positioned for vertical movement between said second pair of rails and at least partially in the area common to both of said tracks; a plurality of rollers rotatably mounted between said first pair of rails adjacent to and within said area common to both of said tracks and a further plurality of rollers rotatably mounted between at least a portion of said second pair of rails and adjacent said platform; a further group of rollers mounted on said platform and at least partially located in an area common to both of said tracks and in said area interpositioned among said first named rollers for simultaneous upward and downward movement with respect thereto; rotatable means below and at each of the ends of said platform adapted for effecting simultaneous vertical movement of said entire platform; a bar operatively connecting each of said rotatable means and adapted for coordinating their operation, and means for effecting such operation.

6. In a gravity conveyor switch mechanism having one track branching from another track, the combination comprising: a first pair of curved rails defining one track; a second pair of rails associated with said first pair of rails and defining a second track; a platform positioned for vertical movement between one of said pairs of rails and at least partially in the area common to both of said tracks; a plurality of anti-friction article supporting means mounted between a portion of said pair of rails which have said platform therebetween and adjacent said platform and a further plurality of anti-friction article supporting means mounted between said other pair of rails adjacent to and within said area common to both of said tracks; a further group of anti-friction article-supporting means mounted on said platform and partially located in an area common to both of said tracks and in said area common to both of said trcks interpositioned among said further plurality of anti-friction article-supporting means for simultaneous upward and downward movement with respect thereto; means below said platform adapted for effecting simultaneous vertical movement of said entire platform, and means for effecting such operation.

7. In a gravity conveyor switch mechanism having one track branching from another track, the combination comprising: a first pair of curved rails defining one track; a second pair of rails associated with said first pair of rails and defining a second track; a platform positioned for vertical movement between said second pair of rails and at least partially in the area common to both of said tracks; a plurality of anti-friction article supporting means mounted between said first pair of rails adjacent to and within said area common to both of said tracks and a further plurality of anti-friction article supporting means mounted between at least a portion of said second pair of rails and adjacent said platform; a further group of anti-friction article supporting means mounted on said platform and at least partially located in an area common to both of said tracks and in said area interpositioned among said first-named anti-friction article supporting means for simultaneous upward and downward movement with respect thereto; means below and at each of the ends of said platform adapted for effecting simultaneous vertical movement of said entire platform, and means for effecting such operation.

JAMES R. SEBASTIAN.

REFERENCES CITED

The following references are of record in the file of this patent:

UNITED STATES PATENTS

| Number | Name | Date |
|---|---|---|
| 1,022,823 | Buck | Apr. 9, 1912 |
| 1,351,554 | Cowley | Aug. 31, 1920 |